UNITED STATES PATENT OFFICE.

ALFRED SARAUW, OF ZURICH, ASSIGNOR TO L. DURAND & HUGUENIN, OF BASLE, SWITZERLAND.

PRODUCTION OF AZO COLORING-MATTER.

SPECIFICATION forming part of Letters Patent No. 413,562, dated October 22, 1889.

Application filed June 23, 1888. Renewed September 20, 1889. Serial No. 324,501. (Specimens.) Patented in France September 6, 1886, No. 178,364, and in England November 5, 1886, No. 14,283.

*To all whom it may concern:*

Be it known that I, ALFRED SARAUW, doctor of philosophy, citizen of Switzerland, residing at 9 Siefeldstrasse, Zurich, Switzerland, have invented certain new and useful Improvements in the Manufacture of Coloring-Matter, (for which Letters Patent were obtained with my knowledge and consent in France, dated September 6, 1886, No. 178,364, granted to the firm of L. Durand & Huguenin, and in England dated November 5, 1886, No. 14,283, granted to Joseph Annaheim;) and I do hereby declare the following to be a full, clear, and exact description of the invention, such as will enable others skilled in the art to which it appertains to make and use the same.

This invention relates to the production of coloring-matter from the salts of the nitroso derivates of the tertiary aromatic amines; and it consists in an improved mode or process of obtaining the coloring-matter, substantially as hereinafter fully described, and set forth in the claim.

In carrying out my invention I treat the nitroso derivates with bioxynaphthalines—such as described by Ebert and Merz—whose boiling-point is about 186° centigrade, and I obtain coloring-matter ranging from violet-blue to blue; but that those conversant with this branch of the arts may fully comprehend my invention, I will give a description of the process in detail with one of the salts, to wit: I take two parts chlorhydrate of nitroso-dimethylaniline and mix them with one part of bioxynaphthaline, to which I add a suitable solvent, such as ethylic or methylic alcohol, acetic acid, or other suitable solvent, and gradually but mildly heat the compound or solution until the yellow shade of the nitroso compound has entirely disappeared and the resultant coloring-matter has precipitated.

I claim—

The herein-described process of obtaining coloring-matter by the reaction of a salt of the nitroso derivates of the tertiary amines, more especially nitroso-dimethylaniline upon a bioxynaphthaline whose boiling-point is about 186° centigrade, in the presence of heat and a suitable solvent, as set forth.

In testimony whereof I affix my signature in presence of two witnesses.

ALFRED SARAUW.

Witnesses:
C. A. MAYER,
WILLIAM SCHNEIDER.